May 25, 1965            KATSUJI ARAKI            3,184,790
SCREW FOR THE COLD FEED EXTRUDER OF THE COMPOUNDED RUBBER
Filed Sept. 16, 1963
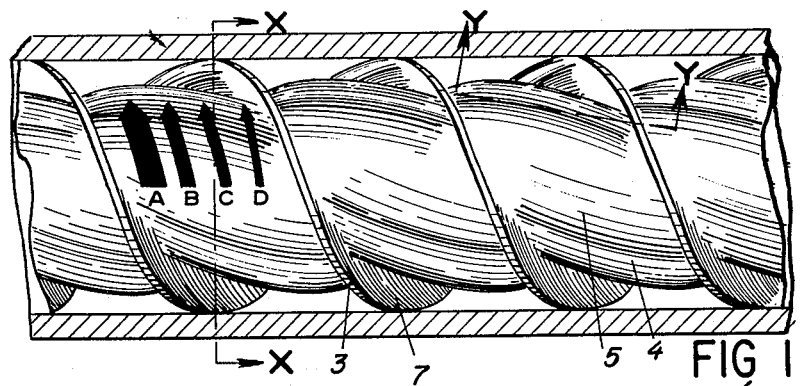
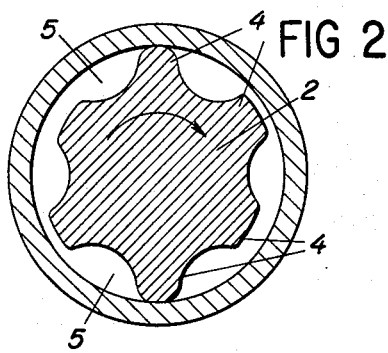
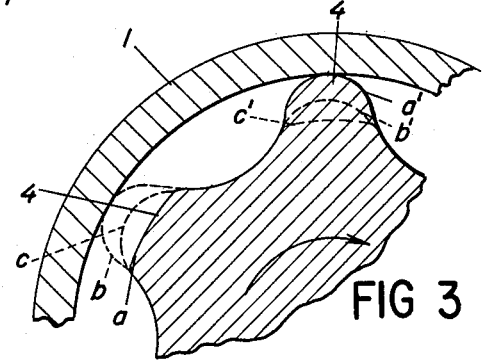
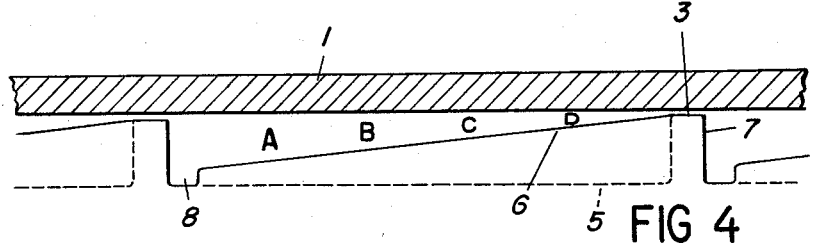
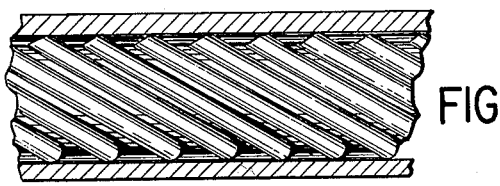
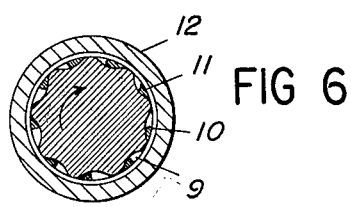
*Katsugi Araki*
INVENTOR
BY *Wenderoth, Lind and Ponack*
ATTORNEYS 3,184,790
SCREW FOR THE COLD FEED EXTRUDER OF
THE COMPOUNDED RUBBER
Katsuji Araki, Ibaraki, Osaka, Japan, assignor to The
Toyo Rubber Industry Co., Ltd., Osaka, Japan, a corporation of Japan
Filed Sept. 16, 1963, Ser. No. 309,135
Claims priority, application Japan, Sept. 15, 1962,
37/40,040
1 Claim. (Cl. 18—12)

This invention relates to a screw for a single screw type extruding machine which is capable, in a single machine, of continuously carrying out the two processes of warming up and extruding of compounded rubber.

Today, it is customary in the rubber industry, to manufacture compounded rubber in the following manner, in two stages of a manufacturing process. After going through the mixing and kneading process wherein various compounding chemicals are mixed and kneaded together with the raw rubber, the compounded rubber is formed into wide sheets or granular shape and is cooled to room temperature and matured, and is then put through a roll kneading process, generally known as the warming up process, for the dual purpose of obtaining the optimum temperature and plasticity for the desired extruding and shaping, and for further improving the dispersion of the various compounding chemicals mixed in the preceding process. After the roll kneading process, the rubber is conveyed by a conveyor to the extruding machine. Here the rubber is further adjusted by the extruding machine, thus making the desired extruding and shaping possible.

Because the warming up process and the extruding process are carried out separately, the process control is quite difficult, and it is not easy to manufacture products of uniform quality and uniform size. In addition, the equipment cost and labour cost become high. Furthermore, generally speaking, the warming up process of the compounded rubber should be carried out by utilizing the interior frictional heat generated inside the compound rubber by a uniform application of mechanical shearing action, because it is impossible to achieve a satisfactory warming up effect by the mere application of external heat.

Some of the conventional extruding machines of this type make use of a screw having an effective length which is 10–15 times longer than its outer diameter, with the groove between helixes which is shallow, or with the bottom surface of the groove provided with edges or threads, in an effort to carry out a warming up process. However, a uniform warming up effect cannot be expected for a highly viscous material such as unvulcanized compound rubber, on account of inadequate mixing and kneading. On the other hand, if the machine is made excessively complicated in order to achieve a satisfctory warming up action, it is usually accompanied by such defects as a decrease in the amount of extrusion due to the excessively strong flow resistance of compounded rubber, or the scorching (premature vulcanization) of compound rubber due to partial stopping of the flow of rubber. In the case of the "Roto-mill," shown in FIGS. 5 and 6, having smooth arc-shaped and multi-threaded screw grooves, an effective mixing action is impossible if the rubber fills the clearance 11 between the fluted rotor 9 and the outside cylinder 12, and accordingly, it becomes necessary to adjust the feeding rate so that the amount of rubber 10 in the device is as shown in FIG. 6 without the clearance 11 being filled with rubber. But, if these requirements are satisfied, the extruding pressure is lowered, and output becomes extremely small as compared with the diameter of the rotor, with the result that it is almost impossible to expect practical effects from the screw for the warming up and extruding machine.

The present invention eliminates all the conventional defects described above.

It is an object of the present invention to provide a screw for kneading and extruding apparatus for warming up an extruding visco-elastic material such as compounded rubber which acts on the material to produce the necessary shear action, yet which has a high rate of material flow and which avoids areas of stagnated material.

The screw according to the present invention has at least one feed helix extending helically therearound, and the surface of the screw between the spires of the helix are tapered inwardly from a trailing spire toward a proceding spire. The surface between the spires has ribs thereon, and the outer surface of the ribs are inclined at the same angle at which the surface is tapered. The ribs have the longitudinal axes thereof at a lead angle to the spires of the helix which is between 50° and 70° and is in the same direction as the spires of the helix.

The invention will now be explained in connection with the following specification and the accompanying drawings, in which:

FIG. 1 is a side elevation view of the screw of this invention shown in a tube, the tube being in section; FIG. 2 is a sectional view of the screw taken on line X—X of FIG. 1; FIG. 3 is an enlarged view of part of FIG. 2, indicating various positions of the shearing surface; FIG. 4 is a diagrammatic sectional view showing the cross sectional shape of the groove along line Y—Y of FIG. 1; FIG. 5 is a side elevation view, partly in section, of a conventional "Roto-mill," and FIG. 6 is a sectional view of the mill of FIG. 5, showing it as it kneads rubber.

As shown in FIGS. 1–4, the screw 2 according to the present invention has at least one feed helix, in the embodiment shown two helixes, 3, extending helically therearound. The surface of the screw 2 between the spires of the helixes 3 is tapered inwardly from a trailing spire, to the right in FIG. 1, toward the bottom 8 of the groove adjacent the preceding spire, to the left in FIG. 1. The surface has ribs 4 thereon and grooves 5 between the ribs 4. The outer surfaces 6 of the ribs 4 are inclined at the same angle at which the said surface is tapered, as shown in FIG. 4. The ribs 4 have the longitudinal axes thereof at a lead angle to the spires 3 of the helix which is between 50° and 70° in the same direction as the spires 3 of the helix. It will be seen that, if the shape of a section perpendicular to the screw axis is, at the beginning, as at $a-a'$, shown in solid lines in FIG. 3, the shape at the same part of the apparatus will become as at $b-b'$ when the screw 2 rotates through 60° in the direction of the arrow, and as at $c-c'$ after a rotation of 120°, and then, after a rotation of 180°, will return to $a-a'$. In this example, therefore, the variation of the shape of the surface of the screw acting on the rubber and in the form of ribs 4 and grooves is repeated in a rotary cycle of 180° if the rubber remains quite immovable while the screw rotates. Since the screw surfaces 4 and 5 have a suitable lead angle in the same direction as the helixes 3, the stagnation of rubber in the neighborhood of the helix 3 can completely be prevented. When the screw 2 rotates, it causes the rubber, assisted by the action of the helix 3 to be pushed toward the die in the axial direction of the screw. In the meantime, the change of shear section described above acts repeatedly on the rubber. Thus, the warming action is fully performed without causing stagnation of the rubber. The varying sizes of arrows in FIG. 1 show the sizes of the flow rates of rubber. As is clear from FIGS. 1 and 3, at the point A near the face 7 on the back of the preceding helix 3 (hereinafter referred to as the back face) on the opposite side to the pushing face of the helix 3, the flow rate of rubber is large, but the shearing action it receives is small. On the other hand, at the points C and D where the clearance from the outside cylinder 1 is small, the flow rate of the rubber is small, but the rubber is subjected to a powerful searing action. The rubber is advanced in the direction of the arrows by the helixes 3 as the screw rotates, and in doing so, the rubber passes uniformly and repeatedly over the ridges 4 and grooves 5 having different clearances as seen at A–D, from the outside cylinder 1. Thus, the screw according to this invention can perform a uniform warming up action at high speed, without a single dead point, such as occurs with the conventional screw, where the rubber does not receive the shearing action.

It may be considered, relative to this invention, to make the back face 7 of the screw 2 an inclined surface against the axis of screw, but, with such a highly visco-elastic material as rubber, which is different from ordinary thermo-plastic material, it is frequently the case that, even in ordinary screw grooves, there is a vacant space on the back side where rubber is not filled. Namely, if the back face 7 is made an inclined surface, the rubber does not flow into the upper part of the back face, and accordingly the mixing effect is not improved. Thus, it is meaningless to make the back face an inclined surface. For this reason, the screw according to this invention has the pushing face, not the back face, formed in an inclined surface, and this inclined surface is provided with wavy surface. With rubber filled in the clearance between the outside cylinder 1 and the screw 2, the aforesaid warming up action is uniformly acted to the rubber. Accordingly, the extruding pressure is increased, and it is possible to obtain extruded and shaped products having a smooth surface containing no air bubbles, at a far higher extruding efficiency than the conventional "Roto-mill" in terms of output.

For instance, "Roto-mill" of 140φ mm. gives an hourly extrusion of about 45 kg. which is only equal to the capacity of an extruding machine having a screw diameter of 60φ mm. designed by the use of the screw according to this invention.

In the practical application of this invention, various factors such as the angle of inclination of the pushing face 6, the size and shape of the wavy surfaces to be provided on the pushing face 6, how their suitable lead angles are taken, how many of them are to be provided along the circumference, and whether the pushing face such as this is to be provided over the entire length of the screw or at a portion of the screw, should be designed and decided in accordance with the type of compounded rubber to be treated and other related conditions. By suitably designing the various parts mentioned above, the screw may also be used, with equal effect, in the plasticizing extrusion of a thermo-plastic resin compound having the high viscosity like compound rubber.

*Example*

The continuous warming up and extruding machine using a screw (150φ mm. in diameter) designed in accordance with this invention, operated at the screw revolutions of 50 r.p.m., and at the temperature of 50° C. in the outside cylinder, fed from the feeding hopper with compounded rubber sheets of 250 mm. in width and 10 mm. in thickness having a temperature of 28° C., was seen to produce at the rubber temperature of 110° C., at the time of extrusion, tire tread at the hourly rate of 960 kg.

As described in detail in the foregoing, the screw of this invention is made capable of obtaining desired extruded products at high efficiency, and continuously from the compound rubber to which the warming up action has not yet been given, by giving an inclination, toward the groove bottom 8, to the pushing face 6 of the threads of screw (the surface on which the visco-elastic material such as rubber is pushed out in the direction of die in the conventional warming up and extruding machine), and providing the said pushing face 6 with the wavy surface 4, 5 at a suitable lead angle in the same direction as the flight 3. In the conventional extruding machine, a highly visco-elastic material like rubber moves in the screw grooves mainly along the side of the pushing face of the screw flights (as has been found out by a study of the flowing state of such rubber in the said extruding machine), with vacant space arising around the back face, with the result that no satisfactory warming up and mixing action may be expected.

In the machine using the screw of this invention, however, the grooves of screw are fully utilized and the extruding pressure is further increased, making it possible to obtain ideal products of extrusion having a smooth surface containing no air bubbles. Moreover, dead points near the center of flow at which the rubber may not receive the shearing action are eliminated, and a sufficient shearing effect is acted to the rubber. Also, the stagnation of rubber occurring on the side of the pushing face, which may result in the scorching of rubber, is completely vanished. Thus, the present invention provides a screw mechanism suitable for treatment of visco-elastic materials, which is capable of realizing, at once, all the actions and effects necessary for the warming up and mixing treatment of rubber.

I claim as my invention:

A screw for a kneading and extruding apparatus for warming up and extruding visco-elastic materials such as compounded rubber, said screw having at least one feed helix extending helically therearound, the surface of the screw between spires of the helix being tapered inwardly from a trailing spire of the helix toward a preceding spire of the helix, and said surface having ribs thereon with the outer surfaces of the ribs inclined at the same angle at which the said surface is tapered and said ribs having the longitudinal axes thereof at a lead angle to the spires of the helix between 50° and 70° in the same direction as the spires of the helix.

References Cited by the Examiner
UNITED STATES PATENTS
2,868,517   1/59   Lasch _____ 18—12

WILLIAM J. STEPHENSON, *Primary Examiner.*
MICHAEL V. BRINIDISI, *Examiner.*